(12) United States Patent
Costabeber

(10) Patent No.: US 8,894,400 B2
(45) Date of Patent: Nov. 25, 2014

(54) STEREOLITHOGRAPHY MACHINE FOR PRODUCING A THREE-DIMENSIONAL OBJECT AND STEREOLITHOGRAPHY METHOD APPLICABLE TO SAID MACHINE

(75) Inventor: Ettore Maurizio Costabeber, Zane' (IT)

(73) Assignee: DWS S.R.L., Vicenza (IT)

( * ) Notice: Subject to any disclaimer, the term of this patent is extended or adjusted under 35 U.S.C. 154(b) by 0 days.

(21) Appl. No.: 14/001,960

(22) PCT Filed: Apr. 19, 2012

(86) PCT No.: PCT/IB2012/000775
§ 371 (c)(1),
(2), (4) Date: Aug. 28, 2013

(87) PCT Pub. No.: WO2012/143785
PCT Pub. Date: Oct. 26, 2012

(65) Prior Publication Data
US 2013/0337100 A1    Dec. 19, 2013

(30) Foreign Application Priority Data
Apr. 20, 2011 (IT) ............................... VI2011A0099

(51) Int. Cl.
*B29C 67/00* (2006.01)
(52) U.S. Cl.
CPC ......... *B29C 67/0066* (2013.01); *B29C 67/0085* (2013.01); *B29C 67/0055* (2013.01); *B29C 67/0062* (2013.01)
USPC ........ 425/174.4; 264/308; 264/401; 425/375; 118/110

(58) Field of Classification Search
USPC ............... 264/401, 308, 492; 425/174.4, 375; 118/110, 120
See application file for complete search history.

(56) References Cited

U.S. PATENT DOCUMENTS 5,238,614 A * 8/1993 Uchinono et al. ............. 264/401
6,764,636 B1 * 7/2004 Allanic et al. ................. 264/401
(Continued)

FOREIGN PATENT DOCUMENTS

WO     2010/045950 A1    4/2010
WO   WO2010/045950 A1 * 4/2010 .............. B29C 67/00

OTHER PUBLICATIONS

International Search Report dated Jul. 25, 2012, issued in PCT Application No. PCT/IB2012/000775, filed Apr. 19, 2012.

*Primary Examiner* — Joseph S Del Sole
*Assistant Examiner* — Nahida Sultana
(74) *Attorney, Agent, or Firm* — Husch Blackwell LLP; George S. Pavlik

(57) ABSTRACT

A stereolithography machine (1) includes: a container (2) suited to contain a fluid substance (3) that solidifies through exposure to predefined radiation (4a); an emitter (4) suited to emit the predefined radiation and to solidify a layer of the fluid substance having a predefined thickness and arranged adjacent to a bottom of the container; a modelling plate (5) supports the solidified layer (6); an actuator (7) that moves the modelling plate perpendicular to the bottom of the container; a leveler (8) in contact with the fluid substance, associated with a power source suited to move them with respect to the container so as to redistribute the fluid substance in the container. The power source moves the container in each one or the two opposite senses of a direction of movement (Y) and the leveler includes two paddles (9, 10) that are opposite each other with respect to the modelling plate.

4 Claims, 3 Drawing Sheets

(56) References Cited

U.S. PATENT DOCUMENTS

| | | | |
|---|---|---|---|
| 6,799,959 B1 * | 10/2004 | Tochimoto et al. | 425/130 |
| 7,713,048 B2 * | 5/2010 | Perret et al. | 425/143 |
| 7,850,885 B2 * | 12/2010 | Philippi et al. | 264/113 |
| 7,879,393 B2 * | 2/2011 | Ederer et al. | 427/203 |
| 7,931,462 B2 * | 4/2011 | Mattes | 425/375 |
| 8,070,474 B2 * | 12/2011 | Abe et al. | 425/375 |
| 8,083,513 B2 * | 12/2011 | Montero-Escuder et al. | 425/375 |
| 8,469,692 B2 * | 6/2013 | Kritchman et al. | 425/375 |
| 2011/0310370 A1 * | 12/2011 | Rohner et al. | 355/53 |

* cited by examiner

STEREOLITHOGRAPHY MACHINE FOR PRODUCING A THREE-DIMENSIONAL OBJECT AND STEREOLITHOGRAPHY METHOD APPLICABLE TO SAID MACHINE

BACKGROUND OF THE INVENTION

1. Field of the Invention

The present invention concerns a stereolithography machine and a stereolithography method applicable to said stereolithography machine.

2. Present State of the Art

As is known, the stereolithography technique is used to produce three-dimensional objects through the successive deposition of several layers of a light-sensitive liquid resin capable of polymerizing through exposure to a light to source.

In particular, each resin layer is superimposed to the preceding layer of the three-dimensional object to be produced and is allowed to selectively solidify in the points corresponding to the volume of the object itself.

A stereolithography machine according to a known embodiment comprises a container suited to contain said liquid resin and provided with a transparent bottom.

There is also a light source, generally a laser emitter or a projector, capable of selectively irradiating the layer of liquid resin arranged adjacent to the bottom of the container so that it solidifies.

The machine comprises also a modelling plate suited to support the solidified layers of the three-dimensional object, associated with actuator means suited to provide for moving the plate in a direction perpendicular to the bottom of the container.

According to a stereolithography method of the known type using the above mentioned machine, first of all the modelling plate is arranged at a distance from the bottom of the container that is equal to the thickness of the layer to be solidified.

Successively, the liquid resin layer adjacent to the bottom of the container is selectively irradiated by means of the light source in order to solidify it.

The modelling plate is configured so that the solidified layer adheres to it while, in the contrary, the bottom of the container is provided with a covering that reduces such adhesion.

The modelling plate is successively moved away from the bottom of the container, so as to make the solidified layer emerge from the liquid resin and thus make it possible to restore the thickness of the liquid resin that is necessary for processing a successive layer of the object.

In fact, lifting the modelling plate and the solidified layer means leaving a depression in the liquid resin, which is filled by the spontaneous flow of the resin itself.

Said levelling action restores the thickness of the liquid resin that is necessary to solidify a new layer of the object and furthermore prevents air bubbles from remaining trapped into the liquid resin during the successive lowering of the modelling plate, which may affect the integrity of the successive layer of the three-dimensional object.

Once said spontaneous levelling is completed, the modelling plate is immersed again in the liquid resin and a further layer of the object is solidified.

The method described above poses the drawback that the overall processing time of the three-dimensional object is considerably prolonged due to the waiting time needed after the solidification of each layer of the object for the liquid resin to level out.

Since the number of layers that form an object obtained through stereolithography can reach several hundreds, it can be understood that the waiting times mentioned above result in a considerable increase in the processing time.

Obviously, the waiting times are proportional to the viscosity of the liquid resin.

Therefore, the drawback mentioned above is particularly important when resins of the so-called "hybrid" type are used, which comprise particles in ceramic or other materials mixed with the polymeric component.

Said hybrid resins are suitable for producing objects with high mechanical resistance but on the other hand their viscosity is much higher compared to the other resins commonly used in stereolithography.

In a known embodiment, described in the Patent application WO 2010/045950, the stereolithography machine includes a circular revolving tank and a fixed levelling paddle arranged in contact with the resin, developing radially with respect to the tank.

Before the solidification of each layer, the tank is rotated so that the levelling paddle fills the depression left by the modelling plate when it is lifted.

This embodiment poses the drawback that the diameter of the tank is at least twice the length of the paddle and therefore occupies a considerably larger space compared to the minimum surface required for modelling.

SUMMARY OF THE INVENTION

The present invention intends to overcome all the drawbacks of the known art as outlined above.

In particular, it is the object of the present invention to provide a stereolithography method and a stereolithography machine that make it possible to produce a three-dimensional object through the solidification of a fluid substance in layers, more rapidly than when employing the method of the known type described above.

It is a further object of the invention to limit the overall dimensions of the machine compared to the machines of the known type.

The above mentioned objects are achieved by a stereolithography machine for producing a three-dimensional object in layers according to claim 1.

The objects described above are also achieved by a stereolithography method suited to be applied to the stereolithography machine as described above, according to claim 3.

Further characteristics and details of the invention are described in the corresponding dependent claims.

Advantageously, the method and the machine that are the subjects of the invention make it possible to produce a three-dimensional object in an overall time that is substantially independent of the viscosity of the fluid substance used.

Therefore, to advantage, the invention is particularly suited to be used with highly viscous liquid substances like, for example, the hybrid resins mentioned above, or with fluid pasty substances whose viscosity is even higher.

Still advantageously, the reduced overall dimensions make it possible to use the machine in smaller spaces.

BRIEF DESCRIPTION OF THE DRAWINGS

The said objects and advantages, together with others which will be highlighted below, are illustrated in the description of some preferred embodiments of the invention which are provided by way of non-limiting examples with reference to the attached drawings, wherein.

DETAILED DESCRIPTION OF THE PREFERRED EMBODIMENTS

Figure 1:
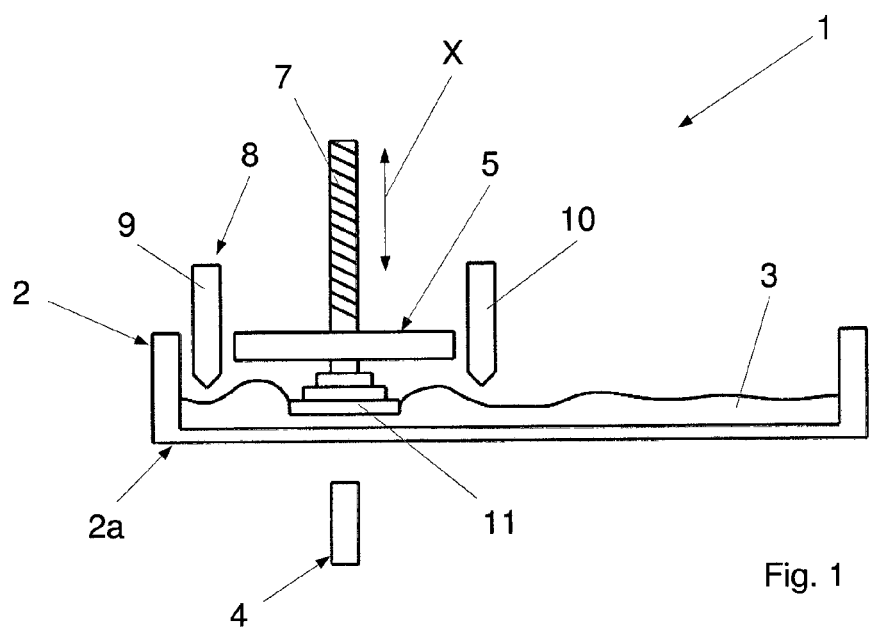
FIGS. 1 to 6 show schematic side views of the stereolithography machine of the invention, in different operating configurations.

The method of the invention is described with reference to a stereolithography machine indicated as a whole by 1 in FIG. 1, which comprises a container 2 containing a fluid substance 3 suited to be solidified through exposure to predefined radiation 4a.

It is specified since now that the term "fluid substance" means a substance suited to be distributed in the container 2 so that its surfaces assumes a substantially flat shape, for example like that of a liquid or pasty substance.

The fluid substance 3 is preferably but not necessarily a light-sensitive polymeric liquid resin and the predefined radiation is light radiation.

In particular, said resin is of the so-called "hybrid" type, comprising particles in ceramic or other materials that are capable of increasing the mechanical resistance of the resin once it has solidified.

However, the method and the machine of the invention may be used with a to fluid substance of any type, provided that it is able to solidify following exposure to predefined radiation.

The machine 1 also comprises means 4 suited to emit the predefined radiation 4a, capable of selectively irradiating a layer of the fluid substance 3 having a predefined thickness and arranged adjacent to the bottom 2a of the container 2 so as to solidify it.

Figure 2:
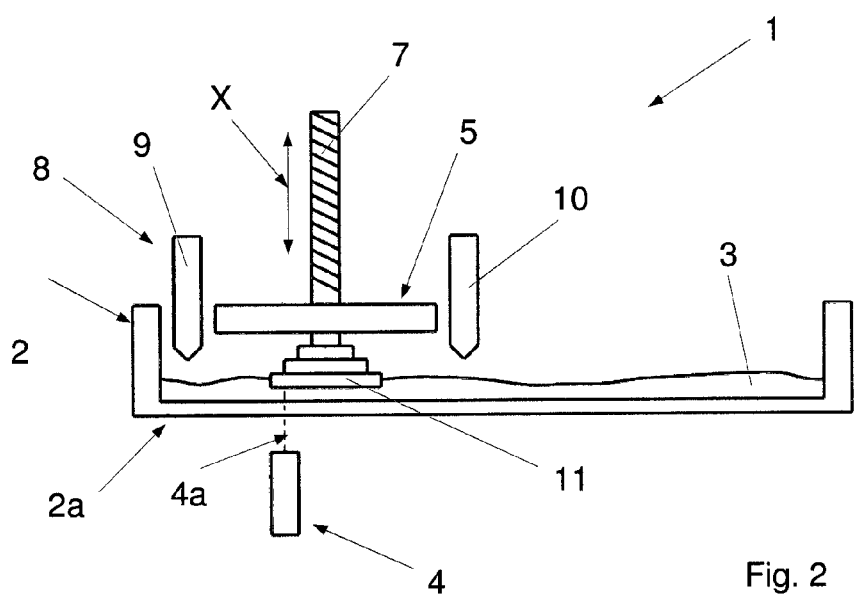

The emitter means 4 are preferably arranged under the container 2 and are configured so as to direct the predefined radiation 4a towards the bottom 2a of the container 2, which is transparent to radiation, as shown in FIG. 2.

Preferably, if the fluid substance 3 is a light-sensitive resin, the emitter means 4 comprise a laser light emitter associated with means suited to direct the light beam towards any point of the above mentioned layer of the fluid substance 3. According to a variant embodiment of the invention, not illustrated herein, the emitter means 4 comprise a projector suited to generate a luminous image corresponding to the surface area of the layer of fluid substance 3 to be solidified.

The stereolithography machine 1 also comprises a modelling plate 5 facing the bottom 2a of the container 2 and suited to support the three-dimensional object 11 being formed.

The modelling plate 5 is associated with actuator means 7 suited to move it with respect to the bottom 2a according to a modelling direction X that is perpendicular to the same bottom 2a.

In particular, the modelling plate 5 is configured in such a way that the fluid substance 3 adheres to it once it has solidified.

On the contrary, the bottom 2a of the container 2 is preferably made of a material that prevents said adhesion.

According to the method of the invention, the modelling plate 5 is immersed in the fluid substance 3 until arranging it at a distance from the bottom 2a that is equal to the thickness of the solidified layer to be obtained.

Figure 3:
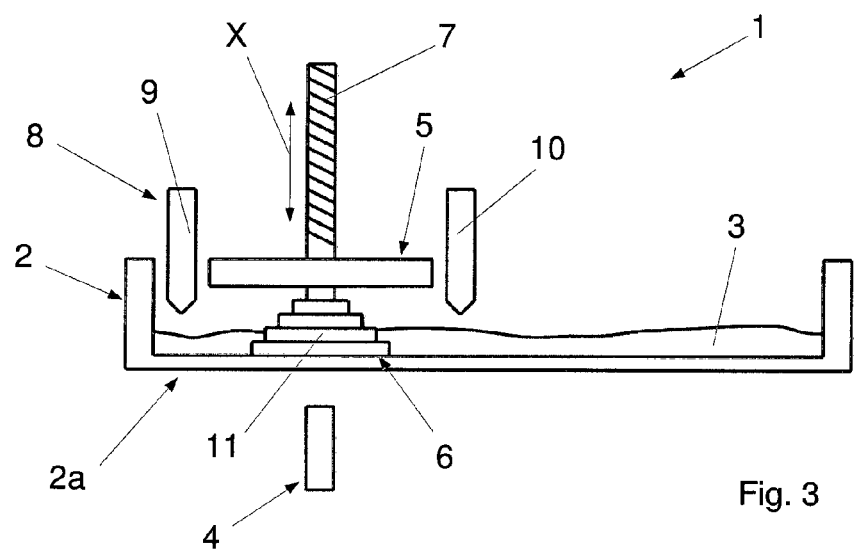

The layer of the fluid substance 3 is then selectively irradiated in order to obtain the solidified layer 6, which adheres to the modelling plate 5, as shown in FIGS. 2 and 3.

Figure 4:
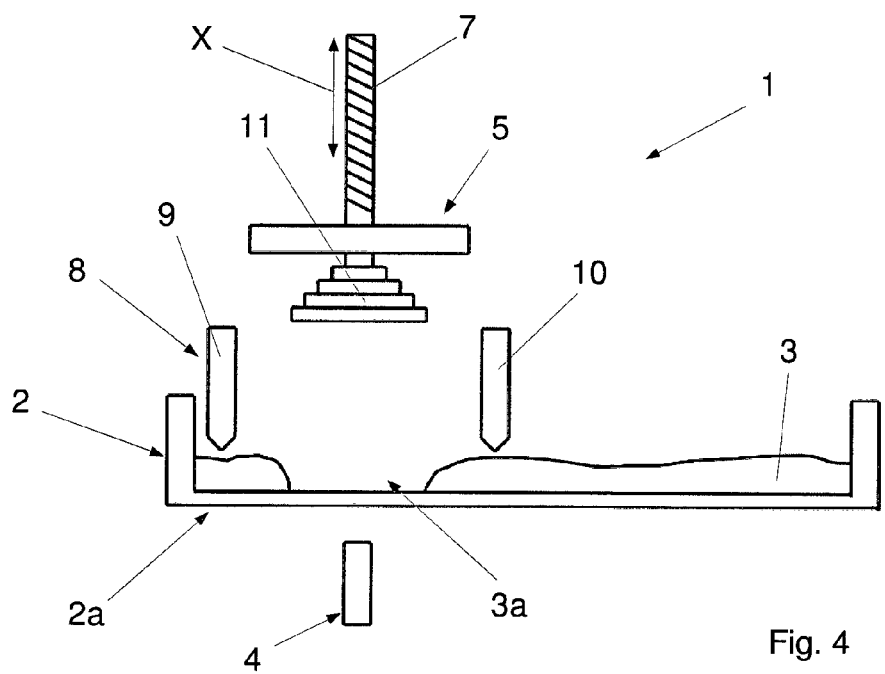

Successively, the modelling plate 5 is lifted in such a way as to move the solidified layer 6 away from the bottom 2a until it emerges from the fluid substance 3, as shown in FIG. 4.

Following the above mentioned movement of the solidified layer 6 away from the bottom 2a, in the fluid substance 3 contained in the container 2 there still is a depressed area 3a at the level of the position previously occupied by the modelling plate 5 and/or by the three-dimensional object 11 being formed.

According to the method of the invention, to fill the above mentioned depression 3a, the fluid substance 3 is redistributed in the container 2 by pushing the fluid substance 3 towards the depression 3a through levelling means 8 arranged in contact with the fluid substance 3.

In particular, said levelling means 8 are associated with power means, not shown herein but known per se, configured so as to move them with respect to the bottom 2a of the container 2 in contact with the fluid substance 3, so as to redistribute the latter as described above.

Successively, the modelling plate 5 is lowered again and the operations described above are repeated in order to obtain the solidification of a further layer of the object 11.

It can be understood that the above mentioned levelling means 8 make it possible to fill the depression 3a in a much quicker way compared to the known method previously described, in which the filling action is due to the spontaneous redistribution of the fluid substance.

Therefore, the waiting time for the levelling of the fluid substance 3 after the solidification of each layer of the object is considerably reduced, thus reaching the aim to reduce the overall processing time compared to the time required by the methods of the known type.

In particular, the higher the viscosity of the fluid substance 3 used, the shorter the overall processing time.

Therefore, the method of the invention is particularly suited to be used when the fluid substance 3 is a hybrid resin with high viscosity, as previously explained.

Preferably, the levelling means 8 are placed in contact with the surface of the fluid substance 3 in an area where the level is higher than the level of the fluid substance 3 at the height of the depression 3a, so as to be able to push the fluid substance 3 towards the depression 3a.

Furthermore, the container 2 can be moved in a direction of movement Y with respect to the modelling plate 5.

The levelling means 8 comprise two paddles 9, 10 arranged on opposite to sides with respect to the modelling plate 5 and mainly developed according to a longitudinal direction perpendicular to said direction of movement Y.

Preferably, the length of the paddles 9, 10 corresponds to the width of the container 2.

In the figures, the paddles 9 and 10 are shown in a side view and therefore is their longitudinal direction is perpendicular to the plane of the figures themselves.

Obviously, the paddles 9, 10 can have any shape, even different from that shown in the figures, provided that they are suited to come into contact with the surface of the fluid substance 3 contained in the container 2 in order to level it.

Figure 5:
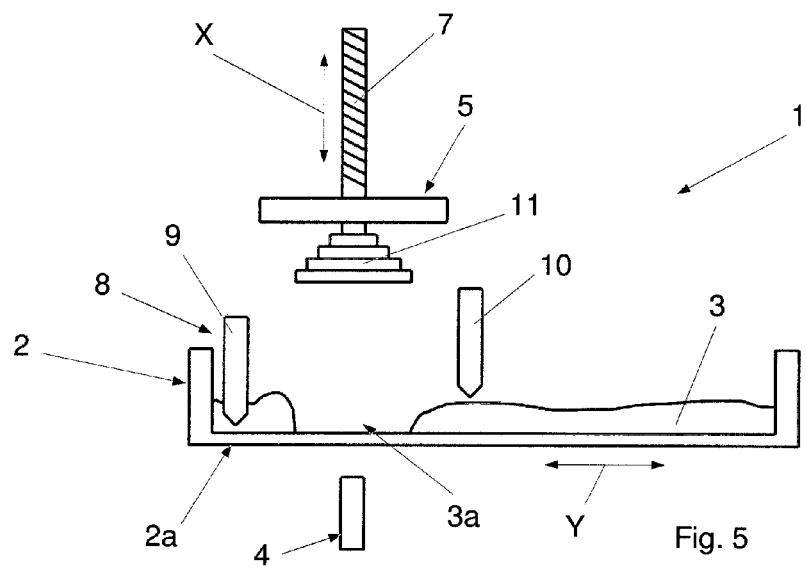
Figure 6:
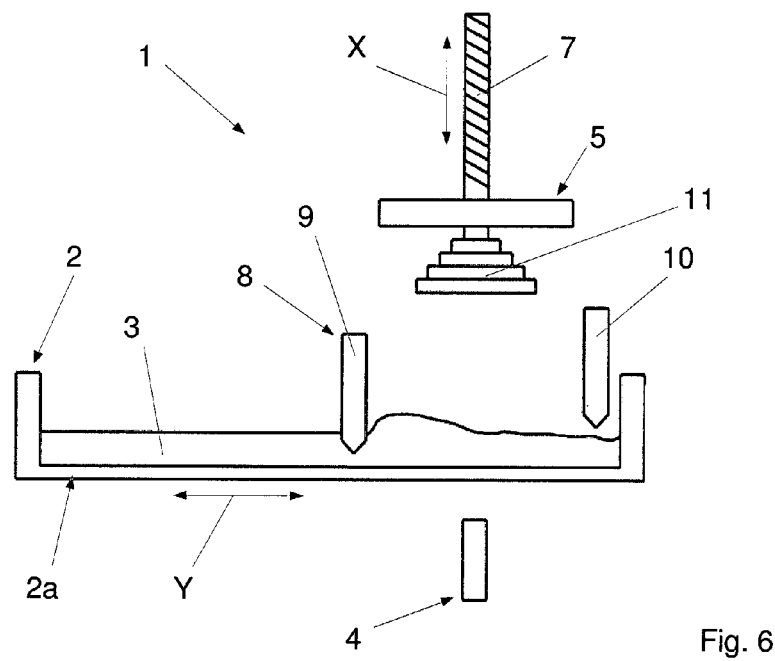

The redistribution of the fluid substance 3 is carried out by maintaining the paddles 9, 10 fixed and moving the container 2 in said direction of movement Y, as shown in FIGS. 5 and 6.

In this way, the paddle that is arranged upstream of the depression 3a with respect to the direction of movement pushes the fluid substance 3 in the depression, thus filling the latter, as shown in FIG. 6.

Advantageously, the presence of two paddles 9 and 10 makes it possible to redistribute the fluid substance 3 in any one of the two directions of movement of the container 2, thus avoiding the need to bring the container 2 back to its initial position before solidifying each layer.

More precisely, after the solidification of a layer, the container 2 is moved so that the area in which there is the depression 3a, visible in FIG. 5, is displaced with respect to the modelling plate 5, thus aligning with the latter a different area of the container 2, not affected by the depression 3a, as shown in FIG. 6.

The solidification of the successive layer can thus take place at the level of this new area of the container 2.

At the same time, during the movement of the container 2, the depression 3a is filled so that the previous area can be used in the successive solidification of a further layer.

Obviously, the possibility to redistribute the fluid substance 3 at the same time as the container 2 is moved in each one of two opposite senses makes it possible to use a container 2 whose surface area is smaller compared to that of the circular container used in the known art.

In fact, the container 2 can have a rectangular shape whose length, according to the direction of movement Y, is equal to approximately twice the minimum dimension required for modelling, and whose width is approximately equal to said minimum dimension.

On the contrary, in the machines of the known type using a circular tank, the is minimum diameter of the container must be equal to approximately twice said minimum dimension.

Preferably, the power means of the paddles 9 and 10 are configured so that each paddle can be immersed in the fluid substance 3 and extracted from it independently of the other paddle.

In this way, to advantage, the redistribution of the fluid substance 3 can be carried out using only the paddle that, with respect to the modelling plate 5, is arranged downstream according to the direction of movement Y of the container 2 or, in other words, upstream of the depression 3a.

In this way, the other paddle is prevented from pushing the fluid substance 3 away from the depression 3a and the redistribution process is facilitated.

The above clearly shows that the invention achieves all the set objects.

In particular, the use of levelling means to fill the depression present in the fluid substance after the solidification of each layer of the object makes it possible to reduce the waiting time before the solidification of the successive layer. Consequently, the overall time necessary to make the three-dimensional object is considerably reduced compared to the time needed when using the stereolithography methods of the known type, and said time reduction becomes larger as the viscosity of the fluid substance used increases.

Furthermore, the presence of two paddles arranged on corresponding opposite sides of the modelling plate makes it possible to level the fluid substance through an alternating motion of the container in two opposite senses, thus avoiding the need to use a circular container which is rather bulky.

The method and the machine that are the subjects of the invention may be subjected to further changes that, even though not described herein and not illustrated in the drawings, must all be considered protected by the present patent, provided that they fall within the scope of the following claims.

Where technical features mentioned in any claim are followed by reference signs, those reference signs have been included for the sole purpose of increasing the intelligibility of the claims and accordingly such reference signs to do not have any limiting effect on the protection of each element identified by way of example by such reference signs.

The invention claimed is:

1. A stereolithography machine comprising:
    a container for a fluid substance, the fluid substance in a liquid or a paste state, the fluid substance suited to be solidified through exposure to radiation;
    an emitter that emits said radiation, the emitter operable to selectively irradiate a layer of said fluid substance located adjacent to a bottom of said container in order to solidify the layer of said fluid;
    a modeling plate suited to support said solidified layer;
    an actuator suited to move said modeling plate with respect to said bottom at least according to a modeling direction that is substantially perpendicular to said bottom;
    a leveler associated with a power device, the power device configured to move said leveler with respect to said bottom of said container to cause said fluid substance to be redistributed in said container;
    said power device being configured to move said container in each one of the two opposite senses of a direction of movement;
    wherein said leveler comprises at least two paddles extending mainly in a direction perpendicular to said direction of movement, said at least two paddles arranged on two corresponding opposite sides with respect to said modeling plate;
    wherein said power device is further configured to move each one of said paddles perpendicular to said bottom and to immerse one of said paddles in and extract said one of said paddles from said fluid substance independently of the other one of said paddles.

2. A method for producing a three-dimensional object in layers by the stereolithography machine according to claim 1, the method comprising:
    a first operation of selectively irradiating a first one of said layers of fluid substance in such a way as to obtain a corresponding one of said solidified layers;
    a second operation of moving said solidified layer away from said bottom to make it emerge from said fluid substance;
    a third operation of redistributing said fluid substance in said container by moving said leveler with respect to said container and placing at least one of the two paddles in contact with said fluid substance to fill a depression caused by the lifting of said solidified layer;
    repeating the first, second, and third operations for a second one of said layers;
    wherein said redistribution process comprises two movements of said container carried out according to mutually opposite senses of said direction of movement.

3. The method according to claim 2, wherein during each one of said two movements the paddle arranged downstream of said depression according to the corresponding direction of movement is kept raised from said fluid substance.

4. A stereolithography machine comprising:
    a container for a fluid substance, the fluid substance in a liquid or a paste state and suited to be solidified through exposure to radiation;
    an emitter that emits said radiation, the emitter operable to selectively irradiate a layer of said fluid substance located adjacent to a bottom of said container in order to solidify the layer of said fluid to form a first solidified layer;
    a modeling plate suited to support said first solidified layer;
    an actuator suited to move said modeling plate with respect to said bottom at least according to a modeling direction that is perpendicular to said bottom;
    a leveler associated with a power device, the power device configured to move said leveler with respect to said bottom of said container to cause said fluid substance to be redistributed in said container;

said power device being configured to move said container in each one of the two opposite senses of a direction of movement;

wherein said leveler comprises at least two paddles extending mainly in a direction perpendicular to said direction of movement, said at least two paddles arranged on two corresponding opposite sides with respect to said modeling plate, wherein the first solidified layer is formed in a first location in the container and a second solidified layer is formed in a second location of the container;

wherein said power device is further configured to move each one of said paddles perpendicular to said bottom and to immerse one of said paddles in and extract said one of said paddles from said fluid substance independently of the other one of said paddles.

* * * * *